Aug. 16, 1966 E. L. WOODS ETAL 3,267,446

MEMORY DECOUPLING CIRCUIT

Filed Nov. 14, 1962

INVENTORS
ELVIN L. WOODS
ROBERT L. KOPPEL
BY John R. Faulkner
John A. Duffy
ATTORNEYS United States Patent Office 3,267,446
Patented August 16, 1966

3,267,446

MEMORY DECOUPLING CIRCUIT

Elvin L. Woods, Tustin, and Robert L. Koppel, Orange, Calif., assignors, by mesne assignments, to Raytheon Company, a corporation of Delaware Filed Nov. 14, 1962, Ser. No. 237,582
7 Claims. (Cl. 340—174)

This invention relates to magnetic memory devices and more particularly to a decoupling circuit for reducing noise in memory array circuitry.

In magnetic circuits such as memory arrays utilizing magnetic core elements, data is stored and processed by means of the interaction between electronic circuitry and magnetic flux in the core elements. In a typical memory array a large number of core elements are arranged in columns and rows. Information is processed to the array by control circuitry for selectively choosing the core elements. In some operations, it is desirable to combine features such as read and write operations in a single conductor threading the core element. In such operations, it is desirable to decouple the electronic circuitry connected with one operation while the other operation is in effect. However, although current is effectively prevented from flowing from the inactive circuitry through the conductor, stray electrical signals generated by leakage currents in the electronic circuitry are propagated through the conductor creating undesirable signals. Accordingly, it is an object of this invention to provide a decoupling circuit for a magnetic memory device.

The memory decoupling circuit of this invention contemplates as a material feature thereof a circuit for preventing stray signals from the interrogate current generating means of a memory device from entering the inactive bit write conductors associated with the magnetic core elements of the device during read operations. According to the invention the read and write operations in a magnetic memory device share the conductors threading the magnetic core elements. Means are provided for generating back bias potentials on diode circuitry connecting the write operation control to the conductors associated with the magnetic core elements. The back biasing prevents stray common mode voltage signals from inducing undesirable currents to flow in the conductors during the read operation. For write operations the write driver control generates signals of sufficient magnitude to overcome the forward drop of the diodes and allow write signals to be communicated to the conductor. In this manner, signals may be read out of the conductor of the memory circuit which are low in amplitude by reason of the improved signal to noise ratio.

It is therefore another object of this invention to provide a diode circuit for improving the signal to noise ratio in a magnetic memory device.

It is another object of this invention to provide a decoupling circuit in a magnetic memory device for back biasing diodes connecting the write control to the memory device during the read operations.

It is a further object of this invention to provide a decoupling circuit in a magnetic memory device for improving the signal to noise ratio during data readout operations.

Figure 1:
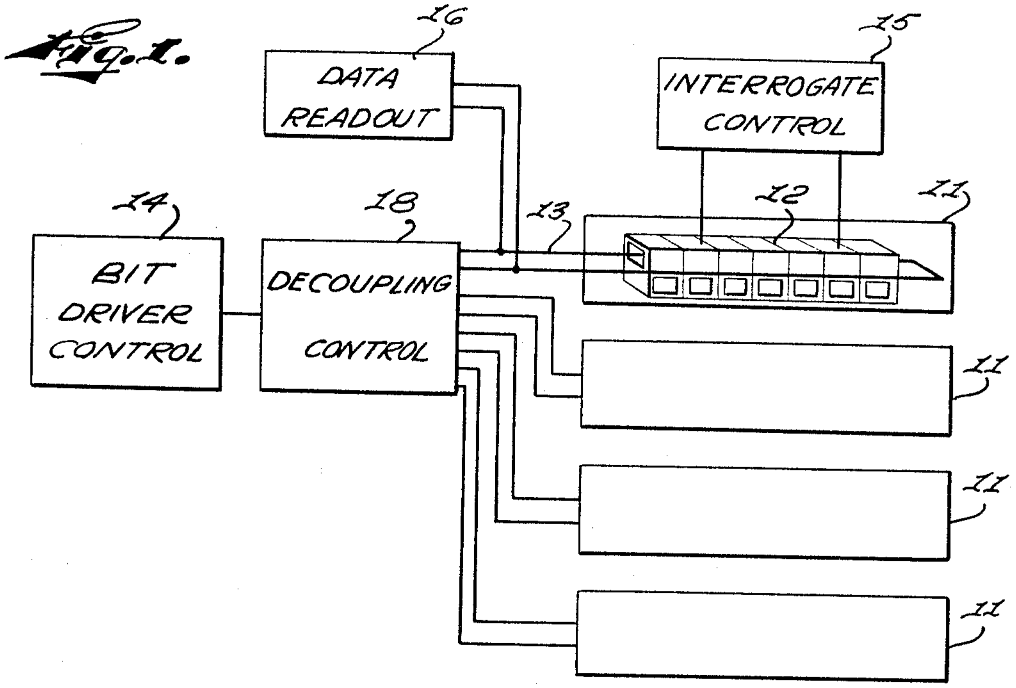
Figure 2:
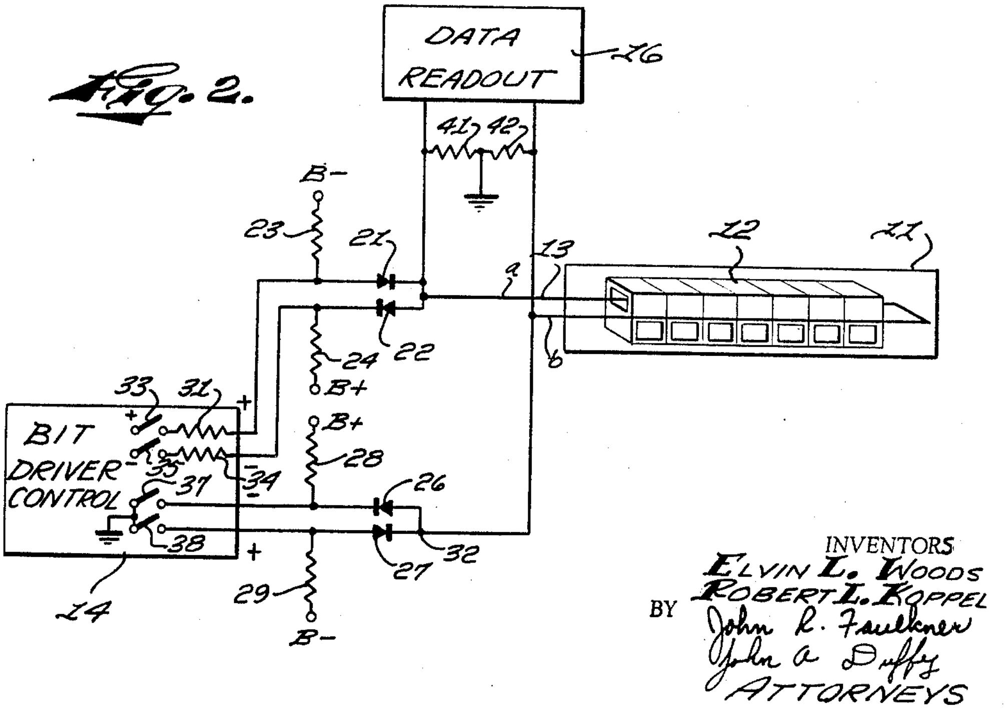

Other objects will become apparent from the following description read in conjunction with the accompanying drawings, in which:

FIG. 1 is a block diagram illustrating the application of a decoupling circuit according to the invention to a magnetic memory device, and FIG. 2 is a schematic diagram partly in block form illustrating the application of the decoupling circuit of the invention to a conductor in a magnetic memory circuit.

According to a principal aspect of the invention, a plurality of magnetic units, each comprising a block of magnetic material having nonintersecting orthogonally disposed interrogate and storage holes therethrough have the units arranged in an array with the storage holes aligned for bit rows and the bit rows disposed parallel to each other to form bit planes. The interrogate holes are thereby aligned with each bit plane defining a word composed of a plurality of bits. A plurality of bit conductors are threaded through the storage holes of the blocks, each with a bit conductor threaded in each word, respectively. A plurality of interrogate conductors are provided with an interrogate conductor threaded through the aligned interrogate holes of each word, respectively. Means are provided for generating bit write current pulses of a polarity corresponding to the information to be stored in the memory system. Circuit means are provided for connecting a bit write means to a selected bit conductor for write operations, and means are provided for decoupling the circuit means from the bit conductors during an interrogate current pulse.

Referring now to the drawing, and more particularly to FIG. 1, a magnetic memory array is illustrated in block form having a plurality of magnetic core memory elements 12 arranged in a typical column and row order, with a column comprising a word of the memory. Each of the core elements 12 may comprise a core element as utilized in a copending application, Ser. No. 61,722, Write Interrogate Memory System, filed Oct. 10, 1960 and now U.S. Patent No. 3,126,532 which is assigned to the assignee of the present application. The pending application illustrates magnetic core elements having a pair of orthogonally disposed openings for providing nondestructive storage of digital information. The core elements 12 may be arranged in rows 11, each row indicative of a word and each row having a conductor 13 passing through an upper opening of each of the elements 12 of the row 11. The conductor 13 serves the dual purpose of providing write signals to the row 11 received from a bit driver control 14 connected through a decoupling control circuit 18 to both ends of the conductor 13. The conductor 13 is also connected to a data readout 16 for read operations. An interrogate control 15 provides interrogate currents to the lower holes of the elements 12 during data readout operations.

In operation of the memory device of FIG. 1, both write and read operations are performed on the elements 12 of the rows 11 through the conductor 13. The bit driver control 14 provides write signals through the bit decoupling control 18 to the conductor 13 during write operations. During data readout operations the conductor 13 provides data readout 16 with signals sensed from the elements 12 of the row 11. During the aforesaid readout operations, it is highly desirous for improved signal to noise ratio and operation to prevent any signals from reaching the conductor 13 from the bit driver control 14. Therefore, the bit decoupling circuit operates to completely decouple the bit driver control 14 from the conductor 13 during data readout operations.

Referring now to FIG. 2, there is illustrated in schematic form circuitry for providing the decoupling operation for the device of FIG. 1. In FIG. 2, there is illustrated a row 11 having a conductor 13 with both ends being connected to the data readout 16. One end *a* of the conductor 13 is connected to the positive and negative polarity terminals of the driver 14 through a portion of the bit decoupling circuit 18 including a pair of oppositely pole diodes 21 and 22 with the cathode of the diode 21 connected in common with the anode of the diode 22 to the end *a* of the conductor 13.

The anode of the diode 21 is connected through a current limiting resistor 31 and a switch 33 to the positive terminal of the bit driver control 14 with the cathode of the diode 22 connected through a current limiting resistor 34 at a switch 35 to the negative terminal of the bit driver control 14. The other end *b* of the conductor 13 is connected through oppositely poled diodes 26 and 27 and switches 37 and 38 to a ground return terminal of the bit driver control 14. The cathode of the diode 27 and the anode of the diode 26 are connected in common to the end *b* of the conductor 13. The diodes 21, 22, 26, and 27 of the decoupling control circuit 18 are each provided with a back bias potential to prevent current from flowing through the diodes during data readout operations. To provide this back bias, a B— potential is connected through a resistor 23 to the anode of the diode 21, a B+ potential is connected through a resistor 24 to the cathode of the diode 22, a B+ potential is connected through a resistor 28 to the cathode of the diode 26 and a B— potential is connected through a resistor 29 to the anode of the diode 27. Resistors 41 and 42 are connected across ends *a* and *b* with their midpoint connected to ground to establish the proper bias level. Thus, in effect, the anodes of the diodes 21 and 27 receive a negative back biasing potential thereon and the cathode of the diodes 22 and 26 receive a positive back bias potential thereon preventing the flow of current therethrough. During write operations, the signals from the write control 14 are of sufficient magnitude to overcome the back bias potential on the diodes.

In operation of the circuit of FIG. 2, during write operations, when it is desired to write on a row 11 with a signal of positive polarity, a positive signal from the write driver control 14 of sufficient magnitude to overcome the minus potential on the anode of the diode 21 and the positive potential on the cathode of the diode 27 is provided from the switch 33 through the diode 21 to the end 13*a* of the conductor 13 and after passing through the word 12 is connected from the end 13*b* through the diode 26 and the switch 37 to the ground return terminal of the bit driver control 14. Similarly, a negative polarity signal is connected from the switch 35 through the minus terminal of the bit driver control 14 through the cathode-anode circuit of the diode 22 of sufficient magnitude to overcome the B+ potential on the cathode of the diode 22 and from there to the end 13*a* and through the word 12 to the end 13*b*. From the end 13*b*, the signal progresses through the cathode-anode circuit of the diode 27 and the switch 38 to the ground return terminal of the bit driver control 14, and is of sufficient magnitude to overcome the B— potential on the anode of the diode 27. During data readout operations no signals of sufficient magnitude to overcome the back bias potential on the diode are propagated from the write driver control 14. Therefore, each of the diodes 21, 22, 26, and 27 has a bias potential thereon preventing the flow of current therethrough. In this manner, a positive decoupling action is provided preventing any stray signals from being propagated down the conductor 13 from the bit driver control 14 source. Signals on the conductor 13 are then due substantially entirely to the signals sensed by a change of flux in the elements 11 of the word 12 and read out by the data readout 16.

The decoupling circuit of the invention utilizing simple diode circuitry provides a positive decoupling action which prevents any stray signals from entering the conductor 13 during read operations. The signal to noise ratio of the memory array is greatly increased allowing data readout of signals of small magnitude.

Although the invention has been described and illustrated in detail, it is to be clearly understood that the same is by way of illustration and example only and is not taken by way of limitation, the spirit and scope of this invention being limited only by the terms of the appended claims.

We claim:

1. In a word oriented one element per bit binary memory system,
   - a plurality of magnetic units, each comprising a block of magnetic material having nonintersecting orthogonally disposed interrogate and storage holes therethrough with said blocks arranged in an array with the storage holes aligned to form bit rows and the bit rows disposed parallel to each other to form bit planes, whereby said interrogate holes are aligned, each said bit row defining a word composed of a plurality of bits,
   - a plurality of bit conductors, with a bit conductor threaded through the storage holes of the blocks of each bit plane respectively,
   - a plurality of interrogate conductors, with a interrogate conductor threaded through the aligned interrogate holes of each word respectively,
   - bit write means for generating bit write current pulses of a polarity corresponding to the information to be stored, on each of said bit conductors,
   - means for generating interrogate current pulses on interrogate conductors in selected aligned interrogate holes,
   - data readout means responsively connected to said bit conductors for determining flux change occurring about each storage hole of a word during an interrogate current pulse,
   - and means for decoupling said bit write current generating means from said bit conductors during an interrogate current pulse.

2. The memory system of claim 1 wherein said decoupling means comprises a pair of diodes connected to each end of a bit conductor for passing positive and negative write current pulses from said bit write means to said bit conductors, and means for back biasing said diodes during an interrogate current pulse to prevent current from passing through said diodes.

3. In a word oriented one element per bit binary memory system,
   - a plurality of magnetic units, each comprising a block of magnetic material having nonintersecting orthogonally disposed interrogate and storage holes therethrough with said blocks arranged in an array with the storage holes aligned to form bit rows and the bit rows disposed parallel to each other to form bit planes whereby said interrogate holes are aligned, each said bit row defining a word composed of a plurality of bits,
   - a plurality of bit conductors, with a bit conductor threaded through the storage holes of the blocks of each word respectively,
   - a plurality of interrogate conductors with an interrogate conductor threaded through the aligned interrogate holes of each word respectively,
   - bit write means for generating bit write current pulses of a polarity corresponding to the information to be stored,
   - first current means for connecting said bit write means to the selected bit conductor for write operations for one polarity,
   - second current means for connecting said bit write means to the selected bit conductor for write operations for the opposite polarity,
   - means for generating interrogate current pulses on interrogate conductors in selected aligned interrogate holes,
   - data readout means responsively connected to said bit conductors for determining flux change occurring about each storage hole of a word during an interrogate current pulse,
   - and means for decoupling said first and second circuit means from said bit conductors during an interrogate current pulse.

4. The memory system of claim 3 wherein said decoupling means comprises a pair of diodes for each of said circuit means connected to each end of a bit conductor, and means for back biasing said diodes during an interrogate current pulse to prevent current from passing through said diodes.

5. The memory system of claim 3 wherein each said circuit means comprises a pair of diodes connected respectively to each end of a bit conductor, with one pair of diodes poled to pass current in one direction through a bit conductor and the other pair of diodes poled to pass current in an opposite direction through a bit conductor, and means for back biasing said diodes during an interrogate current pulse to prevent current from passing through said diodes.

6. In a word oriented one element per bit binary memory system, a plurality of magnetic units, each comprising a block of magnetic material having nonintersecting orthogonally disposed interrogate and storage holes therethrough with said blocks arranged in an array with the storage holes aligned to form bit rows and the bit rows disposed parallel to each other to form bit planes whereby said interrogate holes are aligned, each said bit row defining a word composed of a plurality of bits, a bit conductor for each word threaded through said storage holes, a plurality of interrogate conductors with an interrogate conductor threaded through the aligned interrogate holes of each word respectively, a bit driver control for generating bit write current pulses of a polarity corresponding to the information to be stored, said bit driver control providing a source of current pulses of positive and negative polarity and a ground return source, a first circuit for connecting said bit driver control to a bit conductor for write operations, write operations of positive polarity, said first circuit comprising a first diode connected between the source of bit write current pulses of positive polarity from said bit driver control and one end of said bit conductor, a second diode connected between the other end of said bit conductor and the ground return source from said bit driver control, said diodes poled to conduct current pulses of positive polarity, a second circuit for connecting said bit driver control to a bit conductor for write operations of negative polarity, said second circuit comprising a first diode connected between the negative polarity source of bit write current pulses from said driver control and one end of said bit conductor, a second diode connected between the other end of said bit conductor and the ground return source of said bit driver control, said diodes poled to conduct current pulses of negative polarity, means for generating interrogate current pulses on interrogate conductors in selected aligned interrogate holes, data readout means responsively connected to said bit conductors for determining flux change occurring about each storage hole of a word during an interrogate current pulse, and means for decoupling said first and second circuit means from said bit conductors during an interrogate current pulse.

7. The memory system of claim 6 wherein said decoupling means comprises means for back biasing said diodes during an interrogate current pulse to prevent current from passing through said diodes.

No references cited.

BERNARD KONICK, *Primary Examiner.*

J. MOFFITT, *Assistant Examiner.*